United States Patent
Veres et al.

(10) Patent No.: US 10,184,405 B1
(45) Date of Patent: Jan. 22, 2019

(54) AIRCRAFT ENGINE ICING EVENT AVOIDANCE AND MITIGATION THROUGH REAL-TIME SIMULATION AND CONTROLS

(71) Applicant: The United States of America as represented by the Administrator of NASA, Washington, DC (US)

(72) Inventors: Joseph P. Veres, Olmsted Falls, OH (US); Philip C. Jorgenson, Richfield, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 30 days.

(21) Appl. No.: 15/474,562

(22) Filed: Mar. 30, 2017

Related U.S. Application Data

(60) Provisional application No. 62/323,158, filed on Apr. 15, 2016.

(51) Int. Cl.
  *F02C 9/00* (2006.01)
  *B64D 33/02* (2006.01)
  *F02C 7/047* (2006.01)

(52) U.S. Cl.
  CPC .............. *F02C 9/00* (2013.01); *B64D 33/02* (2013.01); *F02C 7/047* (2013.01); *B64D 2033/0233* (2013.01); *F05D 2220/323* (2013.01); *F05D 2260/81* (2013.01)

(58) Field of Classification Search
  CPC ... F02C 9/00; F02C 9/28; F02C 7/047; B64D 33/02; B64D 15/20; B64D 2033/0233; F05D 2260/81; F05D 2220/323; F01D 25/02
  See application file for complete search history.

(56) References Cited

U.S. PATENT DOCUMENTS

| | | | | |
|---|---|---|---|---|
| 7,921,632 | B2 * | 4/2011 | Jacquet-Francillon | ..................... B64D 15/04 244/134 F |
| 8,711,008 | B2 * | 4/2014 | Cook | ..................... B64D 15/20 340/601 |
| 9,221,548 | B1 * | 12/2015 | Sishtla | ..................... B64D 43/00 |
| 9,846,230 | B1 * | 12/2017 | Finley | ..................... G01S 13/953 |
| 2013/0008174 | A1 * | 1/2013 | Gould | ..................... B64D 15/20 60/779 |
| 2013/0099944 | A1 * | 4/2013 | Hanson | ..................... F01D 21/10 340/962 |
| 2015/0040577 | A1 * | 2/2015 | Dischinger | ............... F02C 7/00 60/779 |
| 2016/0035203 | A1 * | 2/2016 | Rossotto | ................. G08B 19/02 701/36 |
| 2016/0041304 | A1 * | 2/2016 | Grzych | ................. B64D 47/00 701/14 |

* cited by examiner

*Primary Examiner* — Michael J Zanelli
(74) *Attorney, Agent, or Firm* — Robert H. Earp, III; William M. Johnson

(57) ABSTRACT

A process for mitigating or proactively avoiding an aircraft engine icing event may include detecting ice crystals in the atmosphere using one or more sensors on board an aircraft in real time. The process may also include modulating one or more engine operating conditions to proactively change an ice accretion location, to avoid the occurrence of an icing event. The process may further include implementing one or more modulated engine operating conditions in engine controls software, hardware, or both.

18 Claims, 7 Drawing Sheets

AIRCRAFT ENGINE ICING EVENT AVOIDANCE AND MITIGATION THROUGH REAL-TIME SIMULATION AND CONTROLS

CROSS-REFERENCE TO RELATED APPLICATION

This application claims the benefit of Provisional Application No. 62/323,158, filed on Apr. 15, 2016. The subject matter thereof is hereby incorporated herein by reference in its entirety.

ORIGIN OF THE INVENTION

The present invention relates to aircraft engine icing avoidance techniques, and more particularly, to a process for mitigating or proactively avoiding the risk of engine icing in turbofan engines due to high altitude ice crystals without sacrificing fuel burn due to circumnavigating the ice crystal cloud.

FIELD

The present invention relates to aircraft engine icing avoidance technique, and more particularly, to a process for mitigating or proactively avoiding the risk of engine icing in turbofan engines due to high altitude ice crystals without sacrificing fuel burn due to circumnavigating the ice crystal cloud.

BACKGROUND

Often undetectable with current radar, ice crystals in convective storm cells can produce a phenomenon referred to as "Ice Crystal Icing" and ice can accumulate, or accrete in turbofan engines. Ice crystals that accrete in an aircraft engine system can cause serious engine operational problems and sometimes even catastrophic engine failures. If a significant amount of ice were to accrete, the ice could result in a large blockage reducing the available aerodynamic area within the compressor flow path and resulting in change of engine performance. Additionally, if the ice were to grow to a substantial size and shed, the ice would pose a risk of catastrophic damage to the downstream engine components, including the high-pressure compressor blades. The ice might also result in combustor flameout. To avoid ice accretion, the current practice is to circumnavigate, or fly around, the visible storm by a distance on the order of 100 miles or more.

Thus, an alternative approach for detecting Ice Crystal Icing or accretion in the engines may be beneficial.

SUMMARY

Certain embodiments of the present invention may provide solutions to the problems and needs in the art that have not yet been fully identified, appreciated, or solved by current engine icing detection techniques. For example, some embodiments of the present invention generally pertain to a process for modeling engine aerothermodynamic performance in real time, as the aircraft is flying, in any atmospheric condition, and predict if there is a risk of ice accretion at the altitude of interest. When ice accretion is detected, the process may alert the control system of the aircraft to switch into another mode to proactively mitigate or avoid the risk of ice accretion.

In one embodiment, a process may include detecting an icing event using one or more sensors on board an aircraft in real time. The process also includes, when the icing event is detected, modulating one or more engine operating conditions to change an ice accretion location. The process further includes implementing the one or more modulated engine operating conditions in engine controls software, hardware, or both.

In another embodiment, a process for mitigating or proactively avoiding an aircraft engine icing event may include integrating one or more icing computational modules into engine control systems. The integrating of the one or more icing computational modules into engine control systems may include detecting an existence of high altitude ice crystals in an atmosphere, by one or more sensors on board an aircraft, in real time. The integrating of the one or more icing computational modules into engine control systems may also include mitigating or proactively avoiding in real time effects of ice crystals through the engine control systems by modulating one or more engine operating conditions to change an ice accretion location, when ice crystals in the atmosphere are detected, and implementing one or more modulated engine operating conditions in engine controls software, hardware, or both.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention generally pertain to aircraft engine icing event avoidance and mitigation through real-time simulation and controls to dramatically improve aviation safety and reduce operational costs.

Some embodiments include performing real-time analysis, using sensors, engine system aerothermodynamic models, and the compressor flow analysis code, to determine the potential and risk of ice accretion. If the risk of icing is determined, the control system is notified so the control system can modify the engine operating parameters such that accretion can be proactively avoided. In addition, the magnitude of change to the engine operating parameters may be small such that the change would be imperceptible to both the pilot and passengers. This potentially enables the pilot to safely fly through the ice crystal cloud.

One or more embodiments may be applicable to turbofan engines operating at altitudes exceeding 14,000 feet. In some embodiments, the approach is not only flexible and adaptable to any turbofan engine, but also simple, low cost, imperceptible engine adjustment, and improves flight safety. For example, the analytics operate very quickly in real-time to eliminate and/or mitigate the risk of ice accretion. Furthermore, this approach may be implemented with any aircraft turbofan engine and instruments, and the low-fidelity computational system is less complex than three-dimensional CFD. Moreover, the risk of engine failure due to ice accretion may be eliminated and savings in fuel may be realized from a shorter path around a high-altitude storm with convective clouds.

Engine Icing Mitigation and/or Avoidance Strategy

Figure 1:
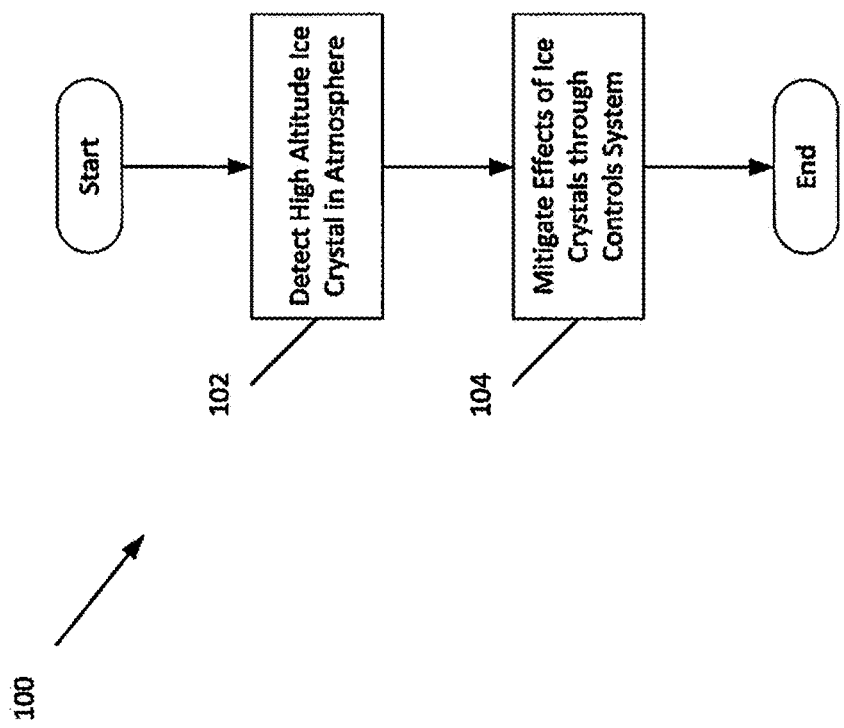
FIG. 1 is a flow diagram illustrating a process for engine icing mitigation and/or avoidance, according to an embodiment of the present invention.

FIG. 1 is a flow diagram illustrating a process 100 for engine icing mitigation and/or avoidance, according to an embodiment of the present invention. Engine icing mitigation and/or avoidance process may involve the integration of icing computational tools into engine controls system. This process 100 may be used to mitigate the risk of an engine icing event through real-time simulation and control of the engine throttle setting.

At 102, the existence of high altitude ice crystals in the atmosphere are to be detected. The existence of ice crystals in the atmosphere can be detected by one or more of the following techniques. The first technique may include low-fidelity engine system and compressor flow analysis models that execute in real-time as an integral part of the control system. For example, the low-fidelity engine system and compressor flow analysis models constantly monitor and determine if the engine is operating at a nominal performance for the given atmospheric conditions and engine throttle setting. The low-fidelity engine system and compressor flow analysis models can estimate whether any of the compression system components are operating within the "icing wedge", which indicates a risk of ice accretion. High-fidelity engine system and compressor flow analysis (CFD) tools that can run in real-time may also be implemented in some embodiments.

The second technique may include an advanced on-board external sensor and/or data monitoring system to detect the presence of ice crystals in the atmosphere. The third technique may include the controls system detecting changes in key engine parameters, which are different from the nominal, such as the ratio of the fan speed to the core speed and an un-commanded change in fuel flow rate, indicating that ice crystals might be in the atmosphere. These may result in an un-commanded change in engine thrust. Finally, the fourth technique may include advanced ground-based radar, or satellite-based sensors, to detect ice crystals in the flight path of the aircraft.

At 104, if ice crystals are detected and the risk of ice accretion is determined by any combination of the above techniques, the real-time engine system model and compressor flow analysis model may then be tasked with mitigating the effects of the ice crystals through the controls system. For example, the models may signal the control system to quickly modify the engine operating parameters such that accretion would be pre-emptively avoided before a significant amount of accretion could occur. As the control system modifies the engine parameters, the location of the potential ice accretion sites within the compression system would move out of the icing wedge zone, thus avoiding the risk of accretion.

In another embodiment, operating parameters may be modulated by the control system and the real-time engine and compressor models to mitigate the risk, such that no significant amount of accretion occurs for a long duration (on the order of 5-20 seconds, depending on the size of the engine) at any specific location within the compression system. Thus, no significant amount of ice would accrete at any one location. Therefore, any small amount of ice accretion that may occur at one location will quickly melt due to the fluctuating wet bulb temperatures at the location where icing was a risk within the compression system. The amount of thrust modification, or modulation of the engine parameters, by the control system may not be detrimental to the operation of the aircraft.

In an alternative embodiment, an adequate amount of heat may be added to the targeted metal surfaces to avoid ice accretion.

Engine System Model and Compressor Flow Analysis Model

The computational module may include a low-fidelity engine system model (e.g., aerothermodynamic cycle code) to provide the air flow, pressures, and temperatures for each engine component, as well as the overall engine performance. The aerothermodynamic cycle code may include characteristic performance maps for each major engine component. The aerothermodynamic cycle code may provide a bypass ratio between the air flow through the fan duct and the air flow through the engine core for the actual engine operating point during flight. The air flow calculated by the aerothermodynamic cycle code and the fan rotational speed are provided as boundary conditions to the higher fidelity compressor flow analysis code (the "flow analysis code").

Simply put, the aerothermodynamic cycle code provides an engine system level model establishing performance of each major component, and provides boundary conditions to the compressor flow analysis code. These conditions may include (1) engine air flow rate, bypass ratio, and core engine flow rate; (2) fan, low pressure spool rotational speed:N1; (3) high pressure spool (core engine) rotational speed:N2; and (4) fuel flow rate.

Since the aerothermodynamic cycle code analysis lacks the fidelity to provide the flow conditions within the stages and blade rows, the flow analysis code is utilized to obtain more detailed aerodynamic analysis of the engine components. For example, the flow analysis code may compute the flow field within the fan and compressor, as well as parameters that indicate the risk of ice accretion. The key icing risk parameters are as follows: the ice particle melt ratio, the static wet bulb temperature, and the ice-water flow rate to air flow rate ratio (IWAR). The flow analysis code may also calculate the local value of relative humidity, as well as its effects on the fluid properties of air and water vapor mixture, and the subsequent effects on compressor performance. The melt ratio in some embodiments refers to the local value of the liquid water to the total water ratio (ice+water) within the ice particle. For there to be a risk of ice accretion, the value of melt ratio should be greater than zero (e.g., $0.0 < \text{Melt Ratio} < \sim 0.20$). The ability to calculate the local relative humidity in each blade row is based on the initial value of specific humidity (mass of water/mass of air) at the engine inlet, as well as the sublimation and evaporation of the particles through the fan and low pressure compressor flow path.

Simply put, the flow analysis code, which may include an ice particle thermodynamic state analysis code (the "state analysis code"), may provide blade-row by blade-row compressor aerodynamic analysis, and enthalpy exchange between the ice particle and air. The flow analysis code may also provide fluid properties of air and/or water vapor mixture, wet bulb temperature (static), IWAR, and ice particle information such as temperature, melt ratio, enthalpy, evaporation, sublimation, and humidity.

In some embodiments, the state analysis code may track the heat exchange between the air and the ice particle and track the particle temperature, sublimation and evaporation. Next, the state analysis code may compute the local ice particle melt ratio (liquid to ice ratio) as the ice particle passes through the various components of the engine. In certain embodiments, this may begin at the engine inlet and move through the fan and low pressure compressor blades and stator vanes. The state analysis code may further calculate ice particle residence times through each component based on the air velocities through the component and the distance the particle travels.

The specific humidity, the ice water content (IWC), and particle diameter are specified at the inlet to the engine. The value for ice particle diameter can be calculated by a "break up model" or varied parametrically. Particle size after breakup due to impact with the engine compression system components that have been utilized in the computational code may fall within a range of 1-20 microns in diameter, and this size range generally results in a melt ratio that is greater than zero. The non-zero melt ratio is a requirement for ice to accrete onto stator vanes and metal surfaces within the flow path. After the flow conditions through the blade rows have been calculated by the flow analysis code, the static temperatures, pressures, and velocities are passed to the state analysis code to determine the rate of melting, sublimation, and evaporation, and thus, the local ice particle melt ratio in each blade row. The calculations for sublimation, melting, and evaporation may take into consideration the local static temperatures, pressures, and residence times as they traverse through the engine inlet, the fan-core and low pressure compressor blade passages and gaps at the mid span location, the gooseneck duct and the support strut upstream of the high pressure compressor.

Figure 2:
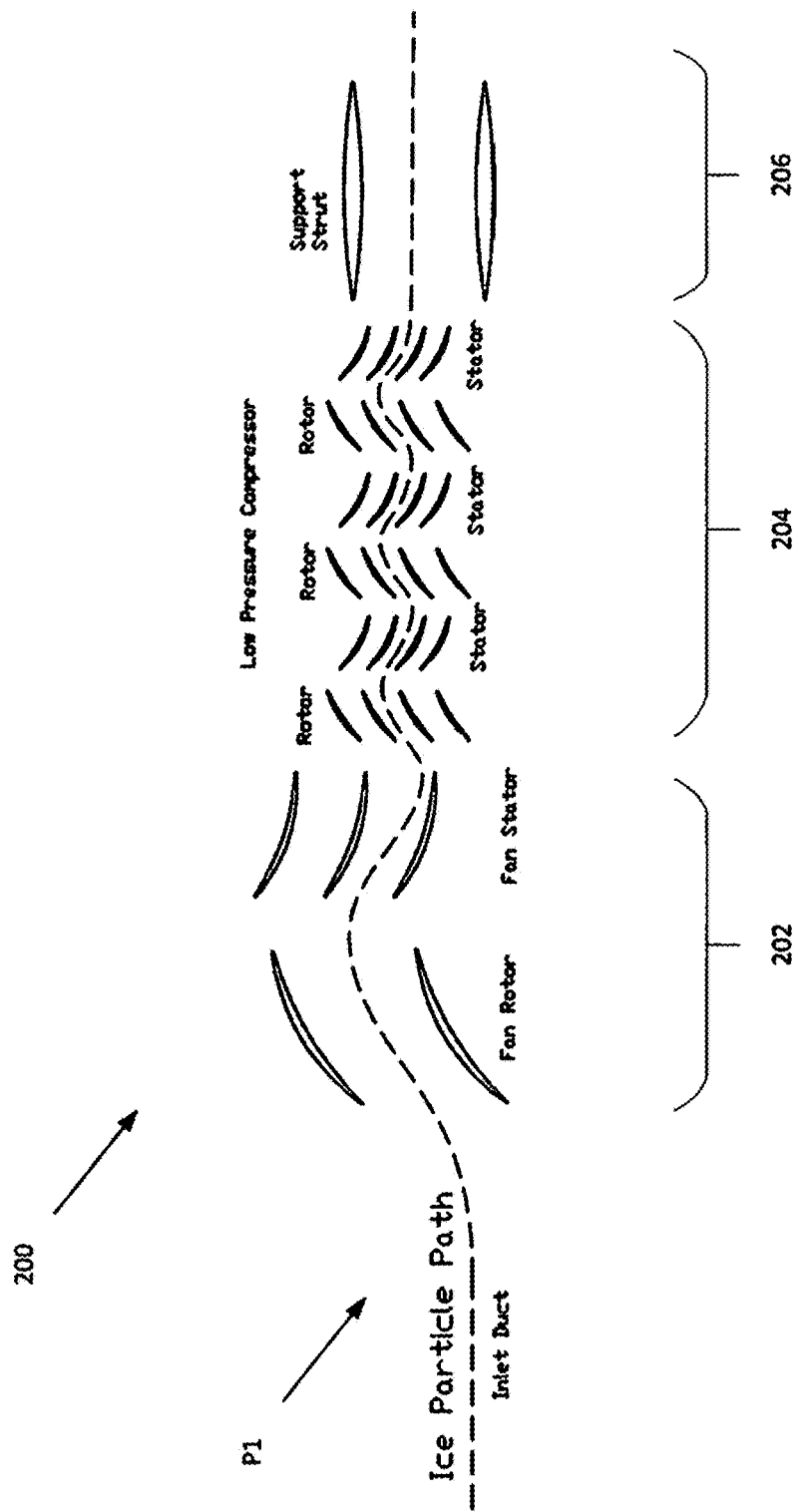
FIG. 2 illustrates a path that an ice particle follows through an engine inlet, fan, low pressure compressor blades, and core engine frame support strut, according to an embodiment of the present invention.

FIG. 2 illustrates a flow 200 of an ice particle path P1 at an engine inlet, through a typical fan 202, low pressure compressor blades 204, and to the core engine frame support strut 206, according to an embodiment of the present invention. The low pressure compressor may include one or more axial compressor stages. In FIG. 2, an illustration of ice particle path P1 through the rotor blades in the relative frame of reference, and the stator vanes in the absolute frame of reference, is provided. The calculations of ice particle sublimation, melt, and evaporation are performed from the leading to the trailing edge of each rotor and stator, as well as through the axial gap between the blades. These are calculated as a function of air velocity, distance traveled and the residence time. The distances traveled are assumed to equal the chord length of each rotor and stator, as well as the gap between the rotor and stator. The amount of water addition to the air due to sublimation and evaporation increases the local value of specific humidity, thus together with the local static temperature, effecting the local relative humidity. Within the compressor flow analysis code, the relative humidity and the local static temperature of the air are utilized to calculate the local wet-bulb temperature.

Figure 3:
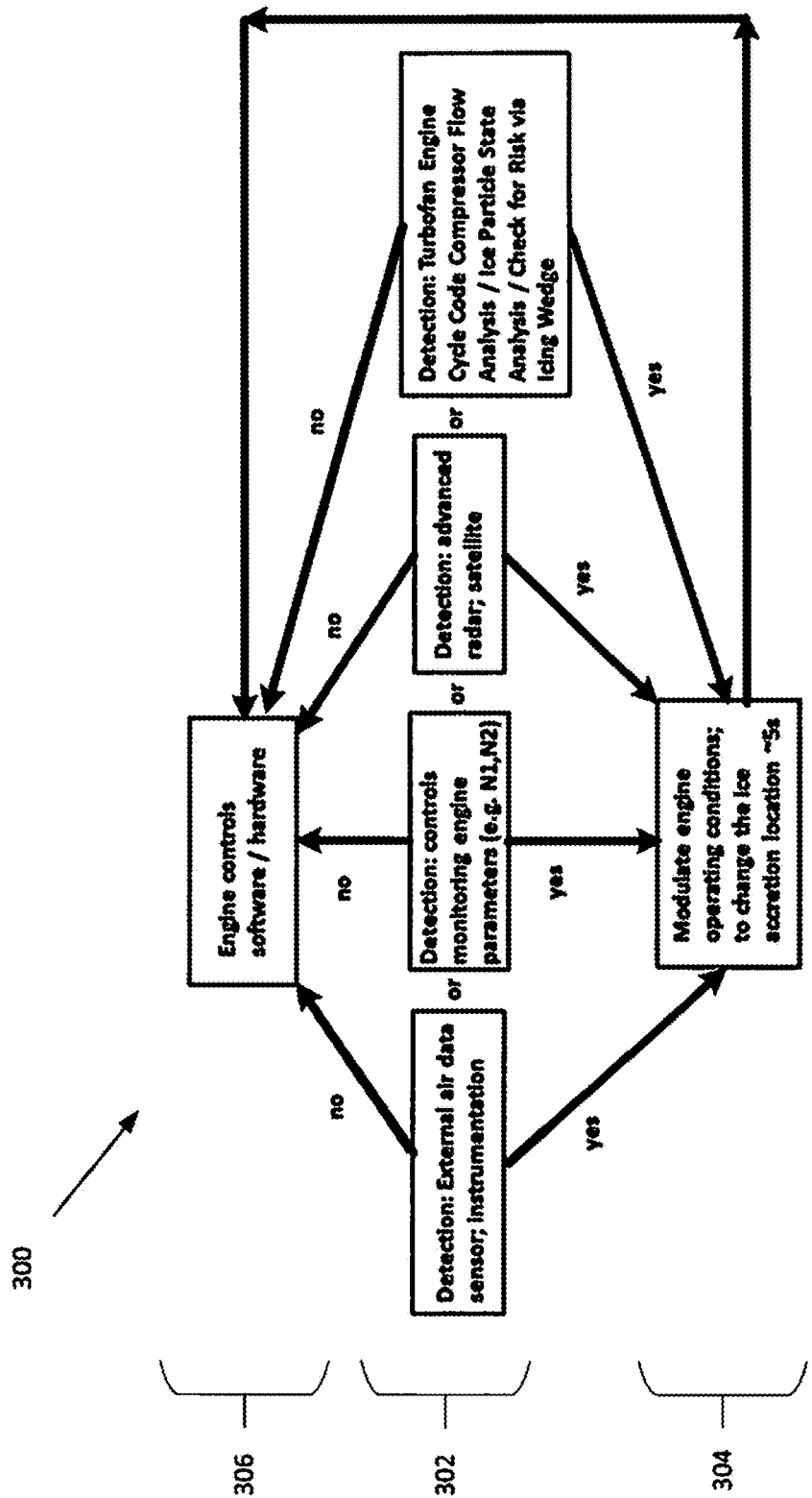
FIG. 3 is a flow diagram illustrating a process for aircraft engine icing event avoidance through real-time simulation and controls, according to an embodiment of the present invention.

The functions described above are illustrated in FIG. 3 as part of the detection and mitigation and/or avoidance procedure. FIG. 3 is a flow diagram illustrating a process 300 for aircraft engine icing event avoidance through real-time simulation and controls, according to an embodiment of the present invention.

In FIG. 3, process 300 generally begins with detecting an icing event at 302. This may occur by using external air data sensor and/or instrumentation, controls monitoring engine parameters, advanced radar and/or satellite, or by using a turbofan engine cycle code, with a compressor flow analysis code including an ice particle state analysis, and/or risk assessment via the icing wedge. If icing risk is detected, then at 304, engine operating conditions are modulated to change the ice accretion location approximately at 5-20 second intervals, for example. At 306, the process may implement the modulated engine operating conditions in the engine controls software and/or hardware.

For there to be a risk of ice accretion, the static wet bulb temperature must be within the minimum and maximum thresholds of static wet bulb temperature. This may be on the order of freezing temperature (0 degree C.), to approximately +3 degree Celsius above freezing (492 degree Rankine to 498 degree Rankine). Concurrently, the minimum value of IWAR must be on the order of 0.002 or greater for there to be a risk of ice accretion. Likewise, the state of the ice particle should have some amount of liquid water component due to partial melting from heat transfer from the air, or from other sources of liquid water. If IWAR exceeds 0.002, then the growth rate of blockage can be nominally on the order of 0.01 cm/sec, and can vary almost linearly as a function of IWAR. In some embodiments, blockage growth rate is defined as the growth rate of physical ice due to accretion, as well as the accompanying growth of the boundary layer. If a significant amount of blockage growth were to occur, the blockage would result in reducing the available aerodynamic area within the compressor flow path, thus changing the performance of the engine. Additionally, if the ice were to grow to a substantial size and shed, the ice would pose a risk of catastrophic damage to the downstream engine components, including the high pressure compressor blades. This might also result in combustor flameout. The size of the ice particle utilized in the compressor flow analyses may be representative of the size distributions experienced after impact with the engine components, including the spinner, fan-rotor, and LPC blading. The particle size after breakup can include a large amount of small particles on the order of from 1-20 microns in diameter. The icing wedge below showing the zone of icing risk, is defined graphically in terms of static wet bulb temperature, IWAR, and the blockage growth rate.

Figure 4:
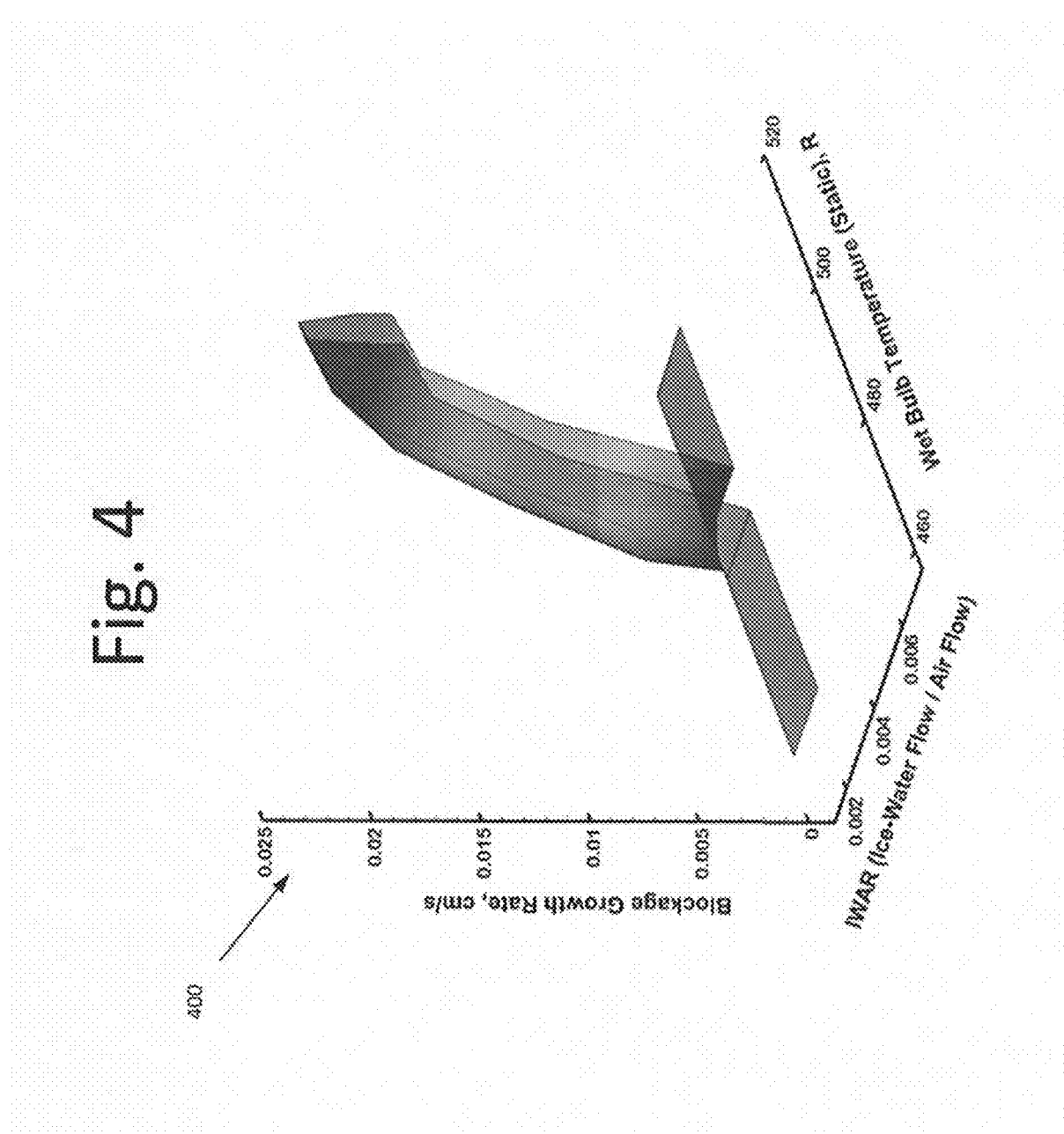
FIG. 4 is a graph illustrating an icing wedge in three dimensions, according to an embodiment of the present invention.

FIG. 4 is a graph illustrating the icing wedge, according to an embodiment of the present invention. More specifically, graph 400 shows the the blockage growth rate (due to ice accretion and boundary layer growth) as a function of IWAR and static wet bulb temperature.

Figure 5:
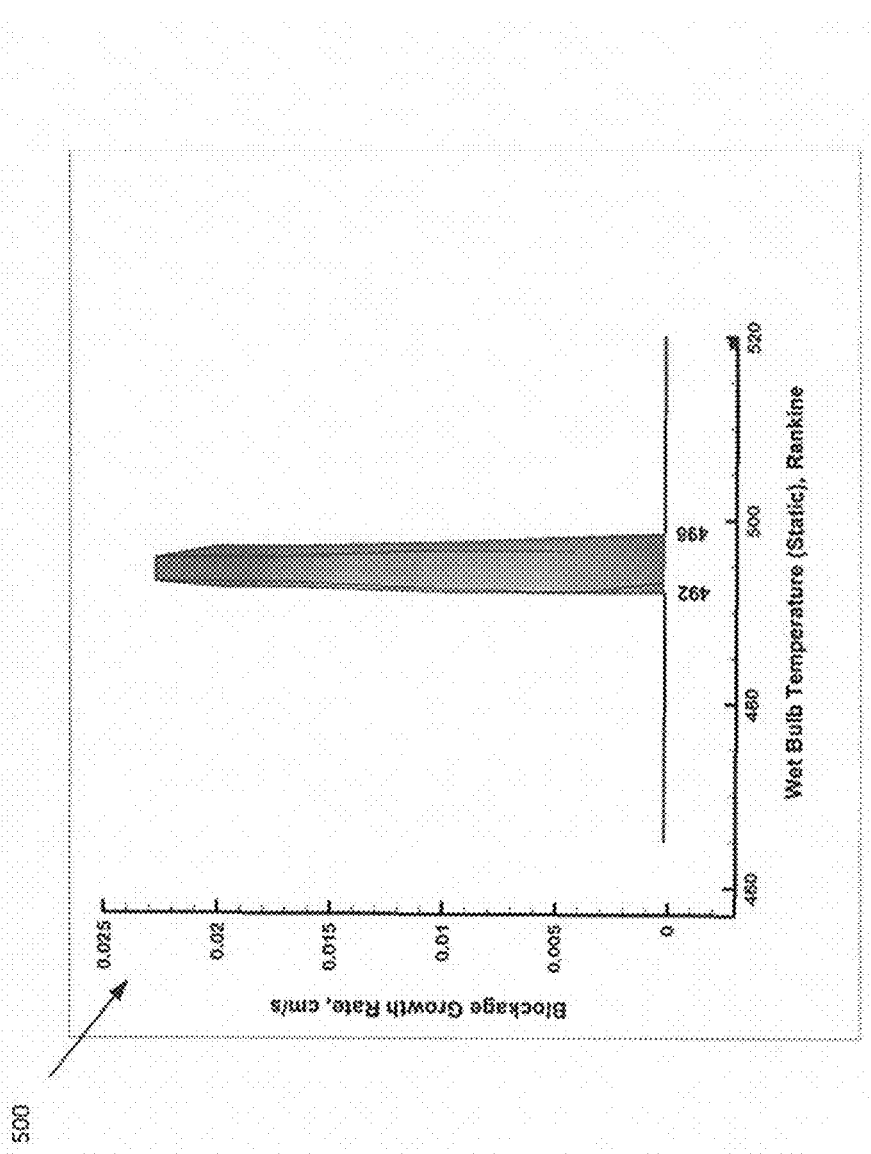
FIG. 5 is a graph illustrating a rotated view of the icing wedge, according to an embodiment of the present invention.

FIG. 5 is a graph illustrating a rotated icing wedge, according to an embodiment of the present invention. In graph 500, the relationship between the aerodynamic blockage due to the accretion of ice in the low pressure compressor versus the local value of static wet bulb temperature is shown. More specifically, graph 500 shows the icing wedge rotated to show the minimum and maximum thresholds of static wet bulb temperature indicating whether there is a risk of ice accretion and resulting blockage growth rate. The limits of static wet bulb temperature that determine whether there is a risk of ice and boundary layer growth are nominally between freezing temperature (0 degree Celsius) to approximately +3 degree Celsius above freezing (492 degree Rankine to 498 degree Rankine).

Figure 6:
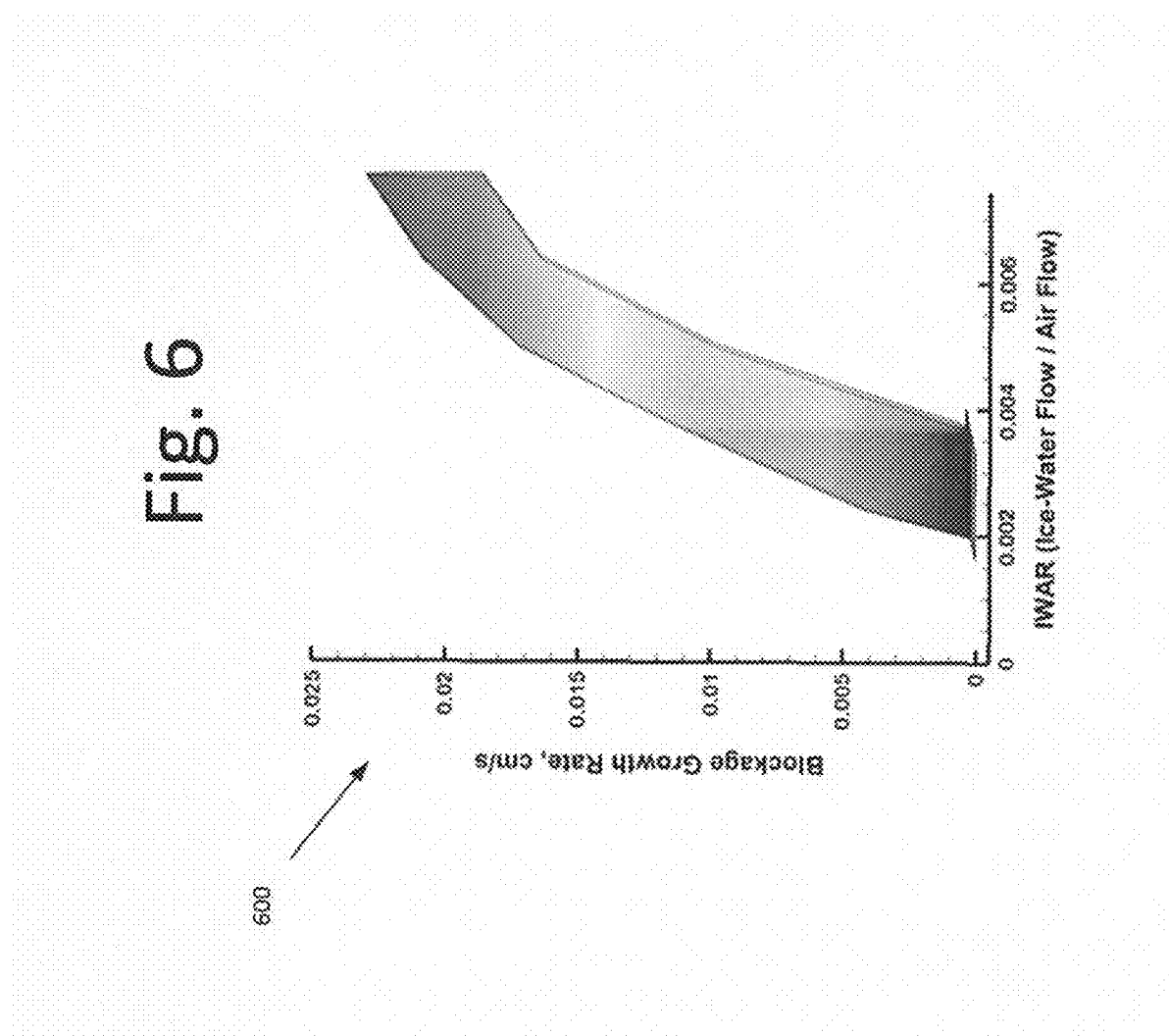
FIG. 6 is a graph illustrating an alternate rotated view of the icing wedge, according to an embodiment of the present invention.

FIG. 6 is a graph illustrating a rotated view of the three-dimensional icing wedge, according to an embodiment of the present invention. In graph 600, icing wedge is rotated to show the blockage growth rate due to ice accretion and boundary layer, as a function of IWAR. This view shows the relationship of the expected aerodynamic blockage due to ice accretion, as a function of the amount of ice crystals entering the engine: IWAR. Values of IWAR above 0.002 can result in a risk of ice accretion, and a corresponding blockage growth rate, if the static wet bulb temperature is concurrently between freezing temperature (0 degree Celsius) to approximately +3 degree Celsius above freezing (492 degree Rankine to 498 degree Rankine).

Figure 7:
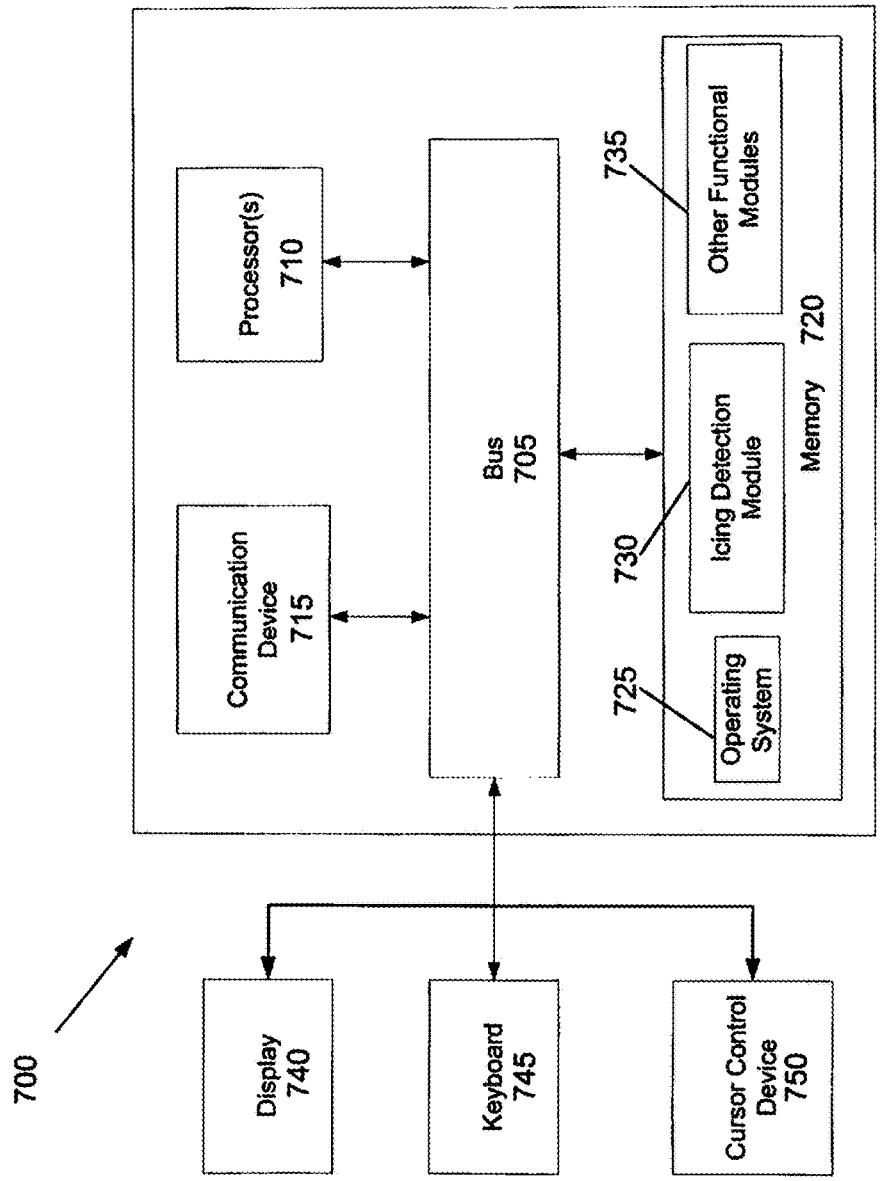
FIG. 7 is a block diagram illustrating a computing system, according to an embodiment of the present invention.

FIG. 7 illustrates a block diagram of a computing system 700 for detecting ice and processing an icing event, according to one embodiment of the present invention. Computing system 700 may include a bus 705 or other communication mechanism configured to communicate information, and at least one processor 710, coupled to bus 705, configured to process information. At least one processor 710 can be any type of general or specific purpose processor. Computing system 700 may also include memory 720 configured to store information and instructions to be executed by at least one processor 710. Memory 720 can be comprised of any combination of random access memory ("RAM"), read only memory ("ROM"), static storage such as a magnetic or optical disk, or any other type of computer readable medium. Computing system 700 may also include a communication device 715, such as a network interface card, configured to provide access to a network.

The computer readable medium may be any available media that can be accessed by at least one processor 710. The computer readable medium may include both volatile and nonvolatile medium, removable and non-removable media, and communication media. The communication media may include computer readable instructions, data structures, program modules, or other data and may include any information delivery media.

At least one processor 710 can also be coupled via bus 705 to a display 740, such as a Liquid Crystal Display ("LCD"). Display 740 may display icing detection information to the user. A keyboard 745 and a cursor control unit 750, such as a computer mouse or a smart pen, may also be coupled to bus 705 to enable the user to interface with computing system 700.

According to one embodiment, memory 720 may store software modules that may provide functionality when executed by at least one processor 710. The modules can include an operating system 725 and an icing detection module 730, as well as other functional modules 735. Operating system 725 may provide operating system functionality for computing system 700. Because computing system 700 may be part of a larger system, computing system 700 may include one or more additional functional modules 735 to include the additional functionality.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A process for mitigating or proactively avoiding an aircraft engine icing event, comprising:
   detecting an existence of ice crystals in an atmosphere, by one or more sensors on board an aircraft, in real time;
   when ice crystals in the atmosphere are detected:
      modulating one or more engine operating conditions to change an ice accretion location; and
      modulating, by a control system and real-time engine thermodynamic cycle model and compressor flow model, one or more operating parameters to proactively mitigate the risk of ice accretion such that no significant amount of ice accretion occurs for a 5 to 20 second duration at any specific location within a compression system; and
   implementing one or more modulated engine operating conditions in engine controls to proactively mitigate the occurrence of an aircraft engine icing event.

2. The process of claim 1, wherein the detecting of the existence of ice crystals comprises determining, by an engine system and compressor flow analysis model, in real-time if an engine is operating at a nominal performance for a given atmospheric condition and an engine throttle system.

3. The process of claim 2, wherein the determining by the engine system and compressor flow analysis model further comprises
   determining if any one of compression system components are operating within an icing wedge, the icing wedge indicative of a risk of ice accretion within the engine.

4. The process of claim 3, further comprising:
   providing, by an aerothermodynamic module of the engine system and compressor flow analysis model, an engine system level model;
   establishing, by the aerothermodynamic module of the engine system and compressor flow analysis model, performance of each major component of an engine; and
   providing boundary conditions to the compressor flow analysis module.

5. The process of claim 4, further comprising:
   providing, by the flow analysis module, blade-row by blade-row compressor aerodynamic analysis and enthalpy exchange between ice particle and air.

6. The process of claim 5, further comprising:
   providing, by the flow analysis module:
      at least one of fluid properties of air and fluid properties of a water vapor mixture;
      at least one of a wet bulb temperature, an ice water flow rate, and an air flow rate; and,
      at least one of a thermodynamic state of an ice particle and an estimate of a water to ice ratio of the ice particle.

7. The process of claim 1, wherein the detecting the existence of ice crystals further comprises using at least one of an on board external sensor and a data monitoring system.

8. The process of claim 1, wherein the detecting the existence of ice crystals further comprises using a controls system to detect changes in one or more engine parameters indicative of ice crystals within a given atmosphere.

9. The process of claim 1, wherein the detecting the existence of ice crystals further comprises using at least one of an advanced ground based radar and satellite sensors to detect ice crystals in a flight path of the aircraft.

10. A process for mitigating or proactively avoiding an aircraft engine icing event, comprising:
   integrating one or more icing computational modules into engine control systems, wherein the integrating of the one or more icing computational modules into engine control systems comprises:
      detecting an existence of high altitude ice crystals in an atmosphere, by one or more sensors on board an aircraft, in real time, wherein the detecting of the existence of high altitude ice crystals in the atmosphere comprises determining, by an engine system and compressor flow analysis model, in real-time, if an engine is operating at a nominal performance for a given atmospheric condition and an engine throttle system;
      mitigating or proactively avoiding in real time effects of ice crystals through the engine control systems by modulating one or more engine operating conditions to change an ice accretion location, when ice crystals in the atmosphere are detected, and implementing one or more modulated engine operating conditions in engine controls.

11. The process of claim 10, wherein the determining by the engine system and compressor flow analysis model further comprises
   determining if any one of compression system components are operating within an icing wedge, the icing wedge indicative of a risk of ice accretion within the engine.

12. The process of claim 11, further comprising:
   providing, by an aerothermodynamic module of the engine system and compressor flow analysis model, an engine system level model;
   establishing, by the aerothermodynamic module of the engine system and compressor flow analysis model, performance of each major component of an engine; and
   providing boundary conditions to a compressor flow analysis module.

13. The process of claim 12, further comprising:
   providing, by the flow analysis module, blade-row by blade-row compressor aerodynamic analysis and enthalpy exchange between ice particle and air.

14. The process of claim 13, further comprising:
   providing, by the flow analysis module:
      at least one of fluid properties of air and fluid properties of a water vapor mixture;
      a wet bulb temperature and at least one of an ice water flow rate and an air flow rate; and at least one of a thermodynamic state of an ice particle and an estimate of the water to ice ratio of the particle.

15. The process of claim 10, wherein the detecting of the existence of high altitude ice crystals in the atmosphere further comprises using at least one of an on board external sensor and a data monitoring system to detect presence of ice crystals in a given atmosphere.

16. The process of claim 10, wherein the detecting of the existence of high altitude ice crystals in the atmosphere further comprises using a controls system to detect changes in one or more engine parameters indicative of ice crystals within a given atmosphere.

17. The process of claim 10, wherein the detecting of the existence of high altitude ice crystals in the atmosphere further comprises using advanced ground based radar, satellite sensors, or both, to detect ice crystals in a flight path of the aircraft.

18. The process of claim 10, wherein, when the existence of high altitude ice crystals in the atmosphere is detected, modulating, by a control system and real-time engine thermodynamic cycle model and compressor flow model, one or more operating parameters to proactively mitigate the risk of ice accretion such that no significant amount of ice accretion occurs for a 5 to 20 second duration at any specific location within a compression system.

* * * * *